Jan. 26, 1960
T. W. CARRAWAY
2,922,290
AIR CONDITIONING SYSTEM
Filed Nov. 27, 1953
5 Sheets-Sheet 1
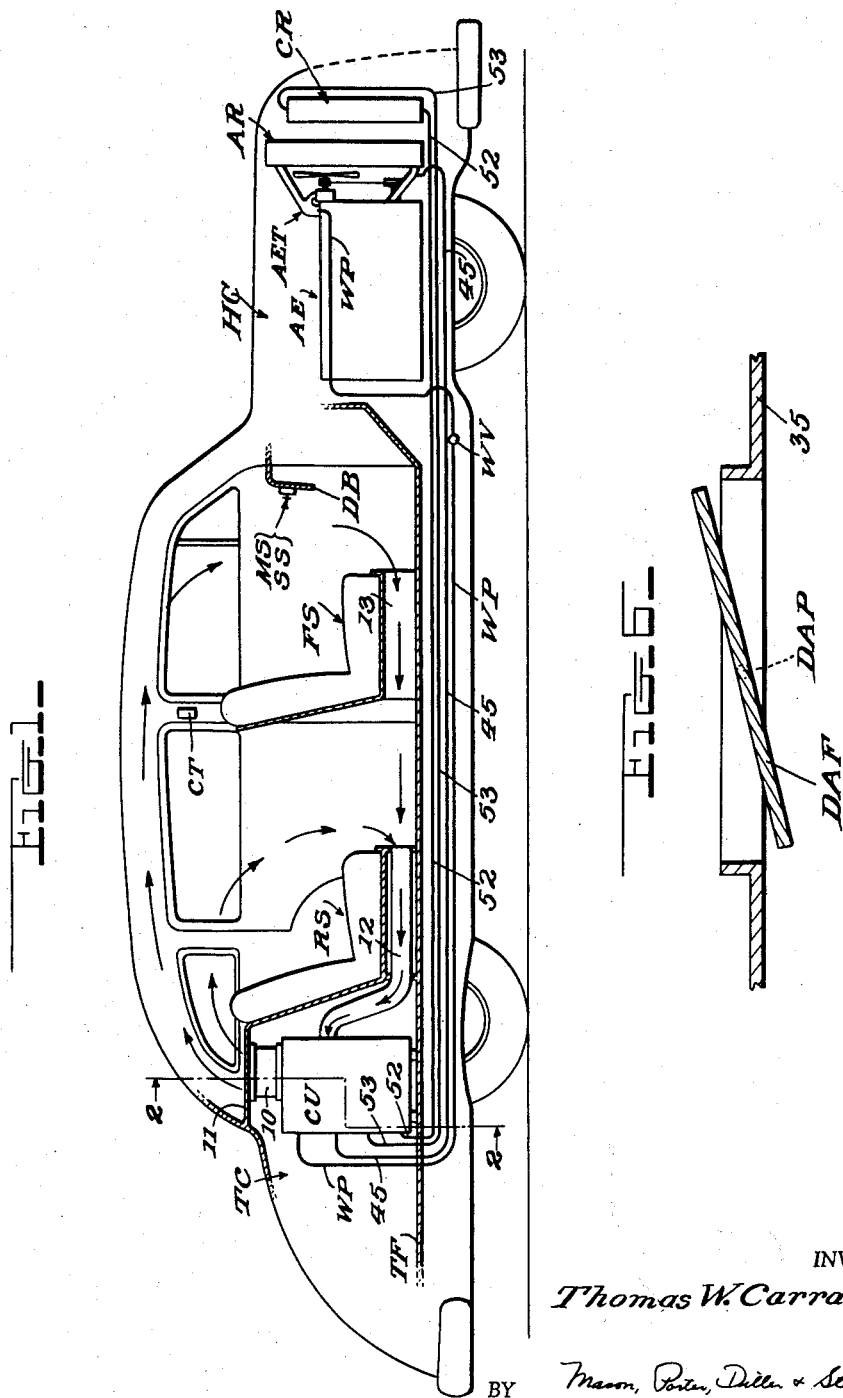
INVENTOR
*Thomas W. Carraway*
BY *Mason, Porter, Diller & Stewart,*
ATTORNEYS

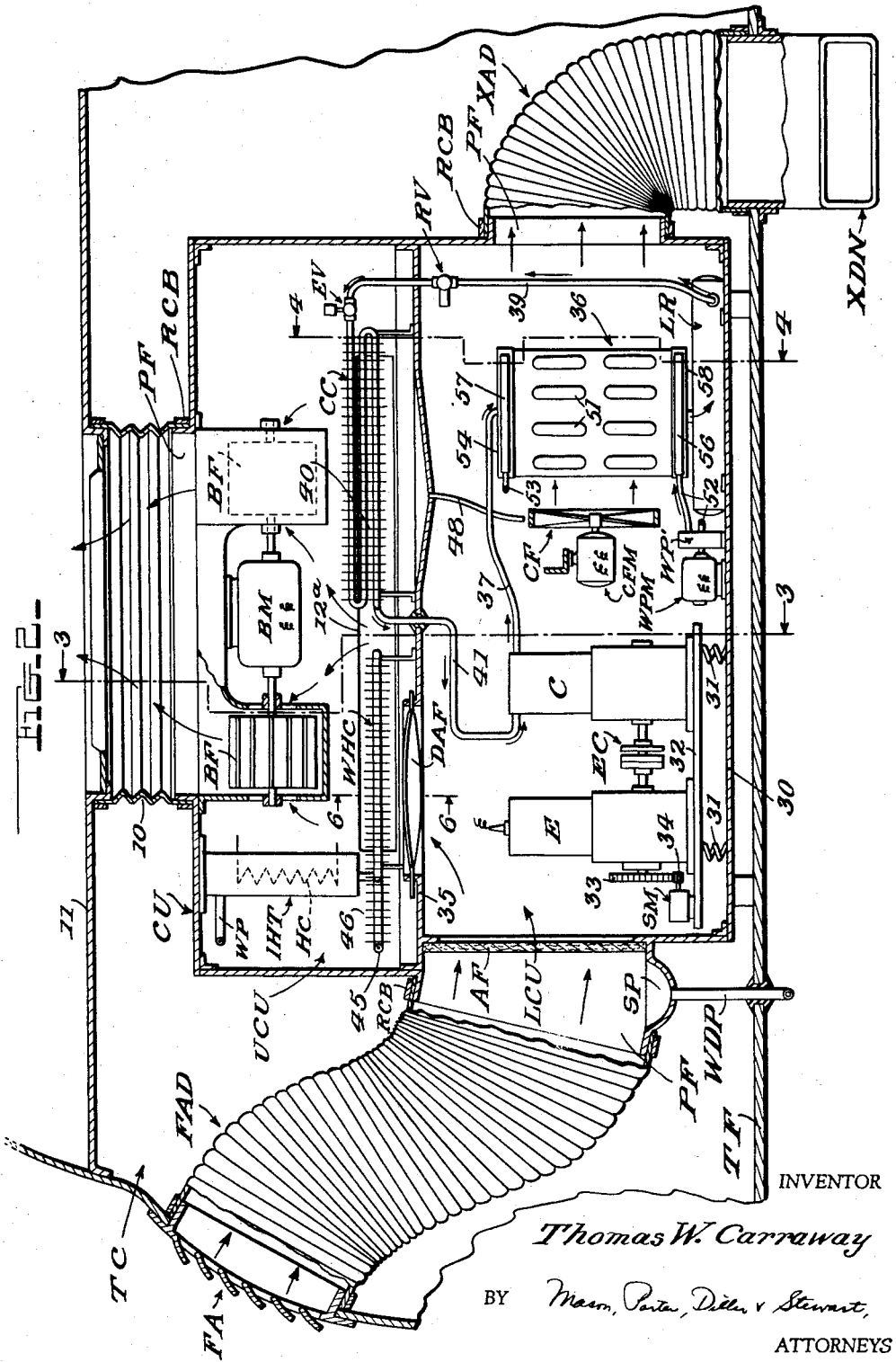

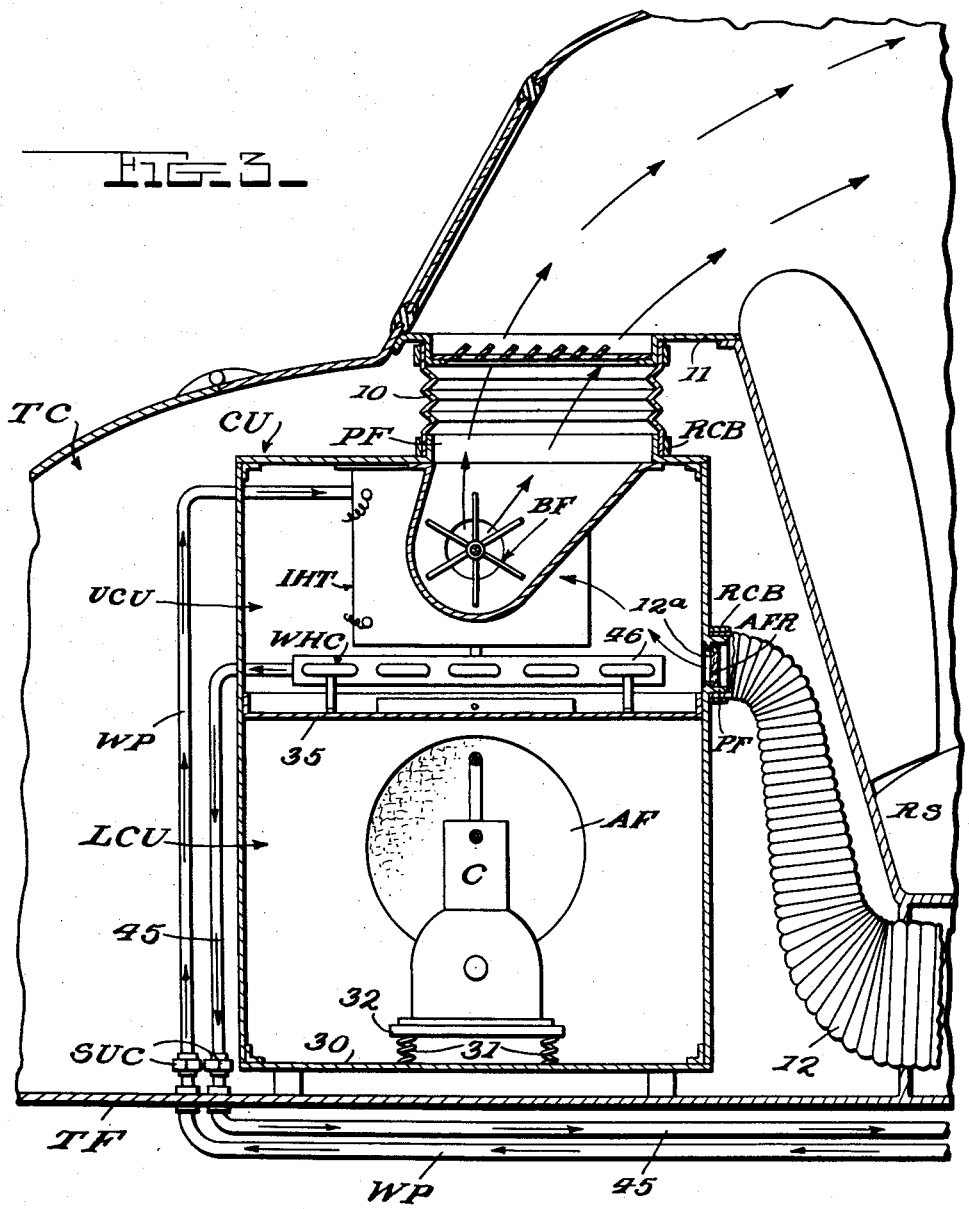

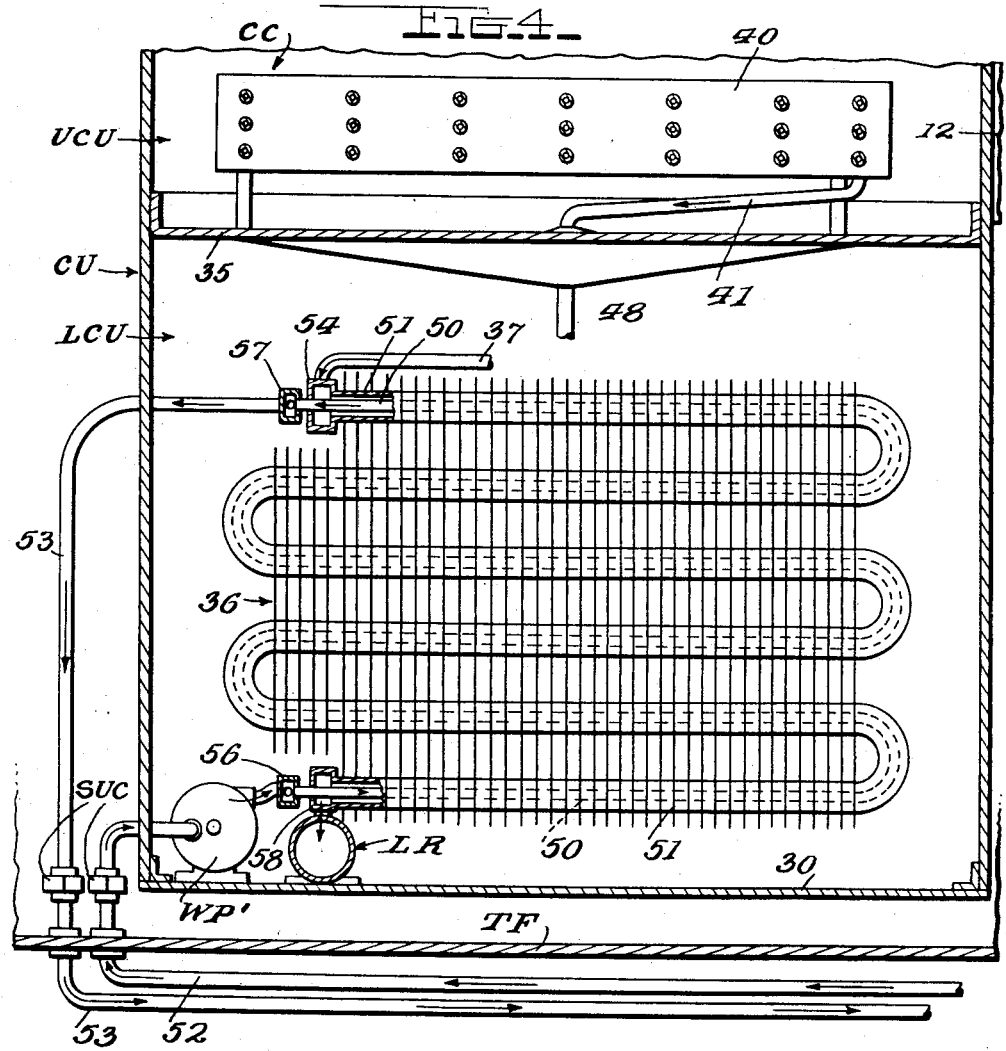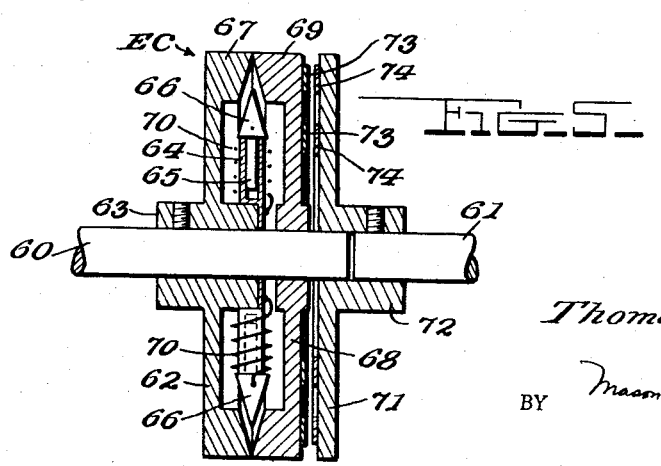

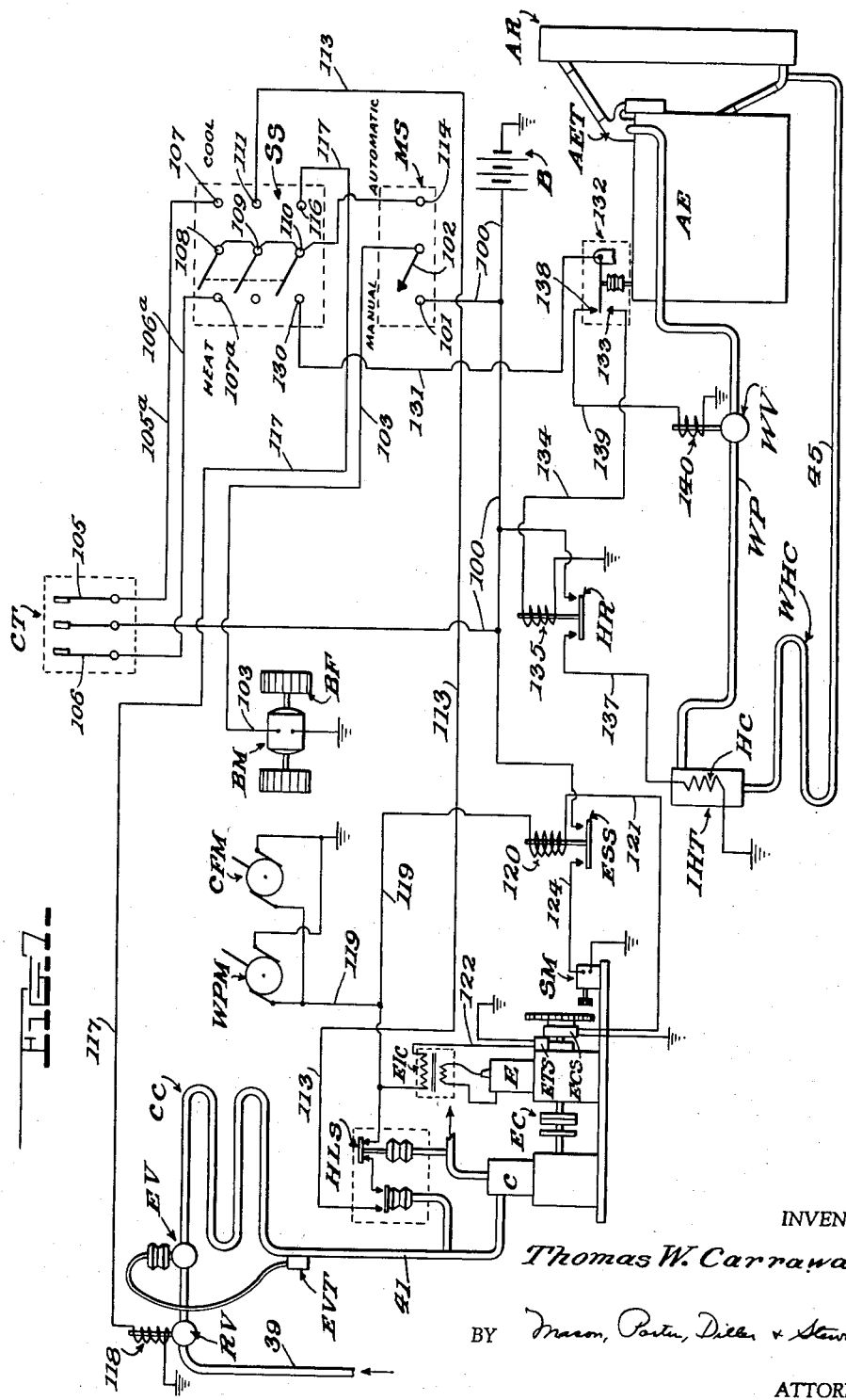

United States Patent Office 2,922,290
Patented Jan. 26, 1960

2,922,290

AIR CONDITIONING SYSTEM

Thomas W. Carraway, Dallas, Tex.

Application November 27, 1953, Serial No. 394,632

5 Claims. (Cl. 62—133)

This invention relates to an air conditioning system having a self-containing cooling plant which is brought into and out of operation in response to the load demand; and, in the preferred form, also includes heating means selectively operable under like automatically-determined conditions.

A feature of the invention is the provision of a cooling plant including a prime mover with means for starting the same, a compressor and refrigerant cycling conduits and parts including a cooling coil in an air duct, and a temperature sensitive device for determining the starting and operation of the plant.

Another feature is the provision of a unit structure including heating, cooling and air moving devices, together with a temperature responsive control, a selecting device and associated circuit parts for determining the operation of the devices.

A further feature is the provision of an internal combustion engine and a compressor, with conduits, condenser and evaporative cooling coil connected with the compressor, and including engine starting devices and a speed-responsive clutch for connecting the engine to the compressor only after the engine has attained operational speed and power.

Another feature is the provision of an automobile air conditioning plant including a removable unit including heating and cooling devices, air ducts leading from and to the exterior of the automobile, a recirculating air duct, and compartments within the unit for air circulation and for power means and condenser means for the cooling device, together with control devices for determining the air movement and the operation of said devices.

With these and other features as objects in view, as will appear in the course of the following description and claims, an illustrative form of practice is set out in the accompanying drawings, in which:

In the drawings:

Fig. 1 is a conventionalized upright section through an automobile, showing structures and parts according to this invention;

Fig. 2 is an upright sectional view through the conditioning unit, essentially on line 2—2 of Fig. 1;

Fig. 3 is an upright section of the unit, substantially on line 3—3 of Fig. 2;

Fig. 4 is a plan view, with parts broken away, of the water-cooled condenser, substantially on line 4—4 of Fig. 2;

Fig. 5 is a detail view, on a larger scale, showing the clutch structures associated with the engine;

Fig. 6 is an upright fragmentary section, substantially on line 6—6 of Fig. 2, of a fresh-air damper;

Fig. 7 is a circuit diagram.

The system is shown illustratively applied to a sedan type of automobile in Fig. 1, in which the body has front and rear seats FS, RS and a thermostat CT is provided on the door post for controlling the conditioning of the air within the body. The usual instrument board DB supports control switches for easy access by the driver. The hood compartment HC of the automobile contains the automobile engine AE having a cooling system which is connected to the automobile radiator AR in the usual manner. An auxiliary conditioning radiator CR is also provided in the hood compartment HC. In the trunk compartment TC is provided a conditioning unit structure CU having (Figs. 2 and 3) a lower power compartment LCU and an upper air circulation compartment UCU having a blower fan BF which discharges air through a duct 10 and a grilled opening in the usual rear shelf 11 of the automobile so that the air circulates by moving into the automobile passenger space and then returns in circuit through a duct 12 provided beneath and in back of the rear seat RS and thus into the upper compartment of the unit CU. Circulation to and around the feet of occupants of the front seat FS is provided by the duct 13 beneath the front seat FS, this duct being illustratively provided by the usual space beneath the front seat.

A hot water conduit WP leads from the engine cooling system to the unit CU; and a return conduit 45 conveys the water back to such system. A conduit 52 leads cool water from the auxiliary radiator CR to the unit CU; and a conduit 53 returns the water to the radiator CR. These conduits may be disposed beneath the car floor, e.g. in channel spaces.

The car body has a fresh air intake louver FA (Fig. 2) in the wall above and at the left side of the trunk space; and a flexible air duct FAD, e.g. of canvas, leads the air to the lower compartment LCU which has an air filter AF mounted across its open left end, with a depressed pocket SP to collect water which enters the louver FA during a rain storm or during car washing, and having a small rearwardly-directed water discharge pipe WDP for its drainage. The car trunk floor TF has an opening adjacent the right-hand end of the unit CU; a flexible duct XAD leads from this end of the lower compartment LCU to this opening; and a rearwardly-directed nozzle XDN is secured beneath the trunk floor for discharging exhaust air, with an aspirating effect while the automobile is moving forward. The flexible ducts 10, 12, FAD and XAD can be respectively secured at the shelf 11, the seat back, the louver FA and the discharge nozzle XDN, and secured over projecting flanges PF of the unit CU by releasable clamping bands RCB: by releasing the clamping bands, the unit CU itself can be released from the ducts preparatory to its removal.

The water pipes WP, 45, 52 and 53 are illustrated as led through openings in the trunk floor TF, and provided with separable union connections SUC so that they may be separated when the unit CU is to be removed.

In the conditioning unit CU shown generally in Fig. 1 and in upright section in Figs. 2 and 3, the bottom 30 supports springs 31 which resiliently mount a platform 32 upon which are the engine E and compressor C of a conditioning unit. The shafts of the engine E and compressor C are coaxial and connected through a centrifugal clutch EC. The engine shaft projects and receives a large gear 33 which is preferably connected to the engine shaft through an overrunning clutch. A starter motor SM has a small pinion 34 as a starter drive which meshes with gear 33 and is effective to turn the same in the starting direction and thereby cause rotation of the engine shaft.

A horizontal partition 35 extends across the housing of the conditioning unit CU (Figs. 2 and 3) to separate the upper and lower compartments, and also serves to collect moisture, such as condensate dripping from the cooling coil CC, and allows it to flow through the drain 48 to the fan CF, which may have a rotating ring to assist in projecting this water onto the condenser coil for aid by its evaporation in reducing the refrigerant to liquid. Such moisture is then discharged through the duct XAD and nozzle XDN. An adjustable damper DAF (Fig. 6) is mounted in an opening in the partition 35 by a pivot DAP, and serves to permit passage of a regulated amount of fresh make-up air from a point in the lower compartment LCU adjacent the filter AF into the upper compartment UCU. The slight plenum thus produced in the car body space is relieved by the usual leakages, or by a partly open window: about 70 percent of the air may be recirculated through duct 12, and the remainder is make-up air moving past the damper DAF. A filter AFR is preferably provided at the connection of the duct 12 with the unit CU, to remove dust and lint from the recirculating air.

Beneath this partition 35 is located a condenser coil assembly 36 which receives the hot compressed gaseous refrigerant from the compressor C through the conduit 37. A condenser fan CF is driven by a motor CFM for delivering air over this coil assembly and thereby abstracting heat from the hot refrigerant, which by countercurrent flow in the water-cooled condenser coil structure is cooled so that liquefaction of the refrigerant occurs and the same is delivered into the liquid receiver LR. From the receiver LR, the liquid refrigerant under pressure flows upward in conduit 39 and through a solenoid-actuated valve RV and the expansion valve EV into the cooling coil assembly CC whereby the fins 40 of this coil assembly are effective to abstract heat from the air within the compartment above the partition 35. The evaporated refrigerant passes back through the return conduit 41 to the compressor C in cycle.

Hot water from the automobile engine is taken by pipe WP when the water valve WV is open and delivered to an initial heating tank IHT within the upper compartment of the conditioner unit CU (Fig. 2) and passes therefrom through the heating coil WHC also located within the upper compartment of the conditioning unit CU, and returns by pipe 45 back to the engine system again. In winter, the water valve WV is opened as described hereinafter in connection with Fig. 7: while in summer this valve is left closed. Thus, during the winter, the air within the upper compartment of the unit CU is heated from tank IHT and the coil WHC with its radiating fins 46: while in summer the air in this upper compartment is cooled by the cooling coil CC and its fins 40. During this cooling of the air in summer, moisture may be deposited therefrom and collected by the partition 35 acting as a sump pan, preferably with a drip opening 48 located above the fan CF so that this cool water is blown onto and also aids in cooling the condenser coil assembly 36.

As shown in Figs. 2 and 4, the water cooling condenser 36 is comprised of sections each including two pipes 50, 51, one located within the other and so connected that the gaseous refrigerant from the header line 54 passes into the annular space between these pipes, while water from the conditioning radiator CR at the front of the automobile (Fig. 1) passes from a conduit 52 into a header 56 and the interior of the inner pipe 50 and moves therein for cooling the refrigerant to below its critical point so that the refrigerant becomes liquid and passes to header line 58 into the receiver LR. The water is thus heated and returns by header 57 and conduit 53 to the conditioning radiator CR. A water pump WP' is preferably connected in the conduit 52 and is driven by the motor WPM for assuring this condenser water circulation. It is preferred to connect a series of condenser units 50, 51 to the headers 56, 57 and connections 54, 58.

The engine E and compressor C (Fig. 2) have their respective shafts 60, 61 (Fig. 5) coaxial. A disk 62 having a hub 63 is secured to the engine shaft 60: the hub 63 has, at the end adjacent the compressor, a ring with a plurality of radially extending sleeves 64, each of which receives and guides the stem 65 of a respective member having a wedge head 66. The outer periphery of disk 62 has a flange 67 projecting toward the compressor. A second disk 68 is loosely mounted on the engine shaft 60 for axial and rotational movement; and has a peripheral flange 69 opposite flange 67. The flanges 67, 69 conform to the wedge heads 66. Each wedge head is connected by a tension spring 70, surrounding the respective sleeve 64, to the structure of hub 63. A third disk 71 having a hub 72 is secured to the compressor shaft 61, and preferably its hub provides a bearing for the end of the engine shaft 60 to maintain coaxiality. The disks 68 and 71 have mechanical clutch rings 73, 74 provided thereon which may be of disk clutch lining material.

In operation, when the engine E is at a standstill, it is disconnected from the compressor: the springs 70 have retracted the wedge heads 66, and there is no driving friction between the rings 73, 74.

When the starting motor SM operates, its associated drive gear (which may be of the self-engaging and self-releasing type known as a "Bendix drive") acts, and the engine E is turned until ignition and regular running occur. In this starting period, the springs 70 maintain control so that the engine starts without load. As the engine speed increases, the centrifugal effect upon the wedge heads 66 and their stems overcomes the spring action, so that the wedge heads 66 move outward and press the flanges 67, 69 apart and cause the disk 68 to move in a frictional driving relationship with disk 71, the pressure increasing with engine speed. In this way, the load of the compressor is only taken up by the engine as it attains adequate speed for the purpose.

In the circuit diagram of Fig. 7, the mechanical parts are conventionalized as the blower fan BF with its motor BM, the water pump motor WPM, the condenser fan motor CFM, the conditioning thermostat CT, the season selector switch SS, the manual switch MS, the battery B, the engine E and the compressor C, the engine ignition coil EIC, the high-low refrigerant responsive switch HLS, the engine timing switch ETS, the centrifugal switch ECS (which may be of the type used in split phase and capacitor electric motors), the starter motor SM, the engine starting relay switch ESS, the water tank IHT with its heater HC, the heater relay HR, and the water pipe WP with its valve WV.

For automobile use, the battery B is grounded at one pole, and the several returns from the motors, relays, etc., are through the machine and automobile frames.

The circuit connections are shown in Fig. 7 with illustrated employment of the usual grounding through the car frame and like metal parts for the return circuit conductor. One pole of the battery B is connected to this ground. The other or "hot" terminal of the battery B is connected by conductor 100 to one end contact 101 of a manually operable single-pole double-throw switch MS whose movable blade or center terminal 102 is connected by conductor 103 to the motor BM of the blower fan BF, with a return by the ground.

When the manual switch MS is moved to close with the terminal 101, current flows from the battery B by conductor 100, terminal 101, manual switch MS to blade terminal 102, conductor 103, the blower motor BM, and back by the ground conductor. The blower motor BM is energized and air is blown into the chamber to be ventilated.

When the manual switch MS is moved to close with the right-hand terminal 114, the circuits are prepared for automatic operation as selected by the season-selector switch SS.

The conductor 100 is also connected to the center or movable blade terminal of the conditioning thermostat CT. The end terminals 105, 106 of this thermostat CT are selectively connected by the conductors 105a, 106a, with the poles 107, 107a, of double-throw season-selector switch having a central or blade terminal 108. Commercially available thermostats are constructed with the parts as described, with the end terminals 105, 106 variable to determine the respective temperatures at which circuit closure and opening occurs, and so that either the contact 105 or the contact 106 may be selected by manual movement of the switch for determining whether the thermostat is to deliver current to the terminal 108 when the temperature has risen to a point determined by the movement of the central blade and the position of the right-hand terminal 105, or when the temperature has fallen to an amount determined by the central blade and the position of the left-hand terminal 106. The terminal 108 is connected to both central or blade terminals 109, 110 of the double-throw season-selector switch SS, which in the right-hand position of the diagram establishes circuits effective in summer for creating a cooling effect in the automobile, and in the left-hand position establishes heating effects for the winter season. The three switch blades in switch SS may be mechanically connected as a triple-pole, double-throw switch structure, with the blade or central terminals 108, 109, 110 electrically connected together and to the right-hand terminal 114 of the manual switch MS. The right-hand contact terminal 111 of the switch SS, cooperative with the blade terminal 109, is joined by conductor 113 to the switch HLS as detailed hereinafter. The right-hand contact terminal 116 of the switch SS is joined by conductor 117 to the coil 118 of the solenoid-actuated refrigerant valve RV located on the conduit 39 for bringing liquid refrigerant to the expansion valve EV.

The switches MS and SS may be mounted on the instrument board DB of the automobile.

The switch HLS includes two independent switching elements each controlled by a pressure in the refrigerant system. When the pressure at the return or "low side" of the system rises, due to evaporation in the cooling coil CC, one switching element responds and closes its contacts. When the pressure at the pressure or "high side" of the system drops, due to movement of refrigerant through the expansion valve, the other switching element responds and closes its contacts. Such switches are commercially available with, for example, bellows connectable to the refrigerant conduits: and the details of such structures are not claimed herein. Functionally, the switch HLS closes when the compressor C should operate; and therewith conductor 113 is connected to conductor 119.

When conductor 119 is energized, current can flow through the coil 120 of the enige starting relay ESS, and thence by conductor 121 to the engine centrifugal switch ECS, which is closed while the engine is stopped or turned at low speed, with a return to ground. The coil 120 when energized closes the starting relay ESS, and current flows from conductor 100 to conductor 124, through the starting motor SM, with a return to ground. The motor SM operates, and turns the engine shaft. Current from conductor 119 also flows to the primary of the engine igniting coil EIC, and thence by conductor 122 to the engine timing switch ETS and to ground; so that the ignition coil acts at the proper part of the engine cycle to deliver a high tension current to the engine spark plug. The engine fires, and begins to speed up, until the centrifugal switch ECS is opened and the coil 120 deenergized: the starter relay ESS opens, and the motor SM stops, with the so-called Bendix drive acting to disconnect it from the engine turning gear. As the engine E attains a maintainable speed, the centrifugal clutch engages, and the compressor C is driven. The conductor 119 also delivers current to the water pump motor WPM and the condenser fan motor CFM, so that these operate and effect cooling of the refrigerant in the condenser.

When the compression at the "high" side of the system, or the reduced pressure at the "low" side, has attained a preset value, or both have occurred together, the switch HLS, thus deenergizing the conductor 119, and the motors WPM and CFM, and the engine E come to a standstill.

During this operation for cooling the car body space, the thermostat CT has initiated operation of the engine E and thus of the compressor C, and has also effected opening of the solenoid valve RV. Liquid refrigerant flows to the expansion valve EV, and thence to the cooling coil CC, producing a chilling thereof, and returns by conduit 41 to the compressor C. The air moving in the upper compartment UCU by the action of the blower fan BF is cooled by the coil CC, and hence acts to cool the general atmosphere in the car body space after it leaves the opening in the car shelf 11. This movement of refrigerant causes a drop of pressure in conduit 39 and a rise of pressure in conduit 41, and hence the switch HLS remains closed at both contacts. The thermostat element EVT on the refrigerant gas return duct 41 responds to the temperature of this duct, which remains high as long as the car air is being cooled by the coil CC and conversely this coil is being heated. When the cooling demand drops, the element EVT responds to the lower temperature of duct 41 and causes a partial closing of the expansion valve EV: if the demand continues low, the pressure in conduit 41 falls by compressor action until the "low side" switch in HLS opens and stops the engine E.

If the pressure at the discharge side of the compressor C becomes excessive for any reason, the "high side" switch element in switch HLS is opened; the engine E comes to a standstill as conductor 119 is deenergized, and cannot be restarted until such excessive pressure has been reduced. Thus the engine and compressor are safeguarded against overloading.

When the temperature in the car body space attains a value at which the thermostat CT opens engagement with the terminal blade 105, the conductor 105a is deenergized, and therewith the conductors 113, 117 so that the engine E comes to a standstill and the valve RV is closed. Also, if the manual switch MS is in the right-hand or "automatic" position, the blower motor BM comes to a standstill.

For heating or winter service, the season-selector switch SS is moved to the left-hand position. The upper contact terminal 107a, corresponding to the blade terminal 108, is connected by conductor 106a to contact 106 of the thermostat CT, so that the system will become operative when the car space temperature is below the value set by this contact 106. The lower contact terminal 130, corresponding to the switch blade terminal 110, is connected by conductor 131 to the central pole of a thermostat switch 132 mounted for response to the temperature of the water in the automobile engine AE. A cooperative terminal 133 of the thermostat 132 is closed so long at this water temperature is below, say, 120 degrees F., and upon closure of thermostat CT, current flows by conductor 106a, season-selector terminal 108, to terminal 110, contact terminal 130, conductor 131, thermostat 132, contact 133, conductor 134, coil 135 of a heating relay HR, and back to ground. Relay HR closes, and current flows from conductor 100 through the relay contacts and by conductor 137 to the heating coil HC in the water tank HT, and to ground: whereby the coil HC acts to produce heat in the upper compartment UCU when there is a heating demand and the automobile engine AE is cold, as when starting on a cold morning. When the engine AE is started, its jacket water rapidly warms and the thermostat 132 opens contact 133, so that relay HR is deenergized and this heating ceases. The thermostat 132 in opening contact 133 also closes contact 138, and current flows by conductor 139 to the coil 140 of the solenoid-actuated water valve WV, so that hot water from the car engine AE flows by pipe WP through valve WV to the tank IHT and thence through the heating coil WHC in the upper compartment UCU, with return by pipe 45 to the engine. It will be noted that pipe WP may be connected to the engine cooling system between the engine block and the engine thermostat AET which acts while the engine is cold to pass the water direct to the engine return rather than to the radiator AR: and that the thermostat 132 is set to respond at a temperature below that of the thermostat AET.

The coil WHC is thus heated by water from the automobile engine AE; and in turn heats the air moved through the upper compartment by the blower fan BF. When the car body space attains the temperature of the setting of terminal contact 106 of the thermostat CT, the circuit is opened and conductor 106a is deenergized, along with conductors 131 and 139, so that the valve WV closes and this heating effect ceases: if the manual switch MS is on "automatic," the blower motor BM also comes to a standstill.

When the season-selector switch SS is in right-hand position, current does not flow through conductor 131; and accordingly the heating conditions are not established. When the season-selector switch is in the left-hand position, current does not flow through conductors 113, 117, and cooling conditions are not established. When the switch SS is in central or open position, no automatic operation can occur, but the blower fan BF can be energized from the manual switch MS, when simple ventilation effects are desired as in the spring and fall.

Under either "Heat" or "Cool" automatic condition as determined at the selector switch SS, a reclosing of the thermostat CT will start a new cycle of heating or cooling until the thermostat CT opens again.

It will be understood that the invention is not restricted to the illustrative practice of employment in heating and cooling an automobile space, but may be employed in other forms and for other purposes within the scope of the appended claims.

What is claimed is:

1. In a plant for air conditioning a space and including a structure having walls defining a first and a second chamber, a refrigerant compressor and a condenser in the first chamber, a refrigerant evaporating coil in the second chamber, ducts including refrigerant control valve means for connecting said compressor with said condenser and said evaporating coil in circuit, an internal combustion engine in said first chamber for driving said compressor, a duct for admitting fresh air to said chambers, a duct for discharging air from said first chamber, and ducts for circulating air from the space being conditioned to said second chamber and back to said space, the combination therewith of a fan for moving air through said first chamber and over said condenser, said condenser having concentric refrigerant and cooling fluid tubes, a pump for moving cooling fluid through the inner fluid tube, the annular space between said fluid tubes being a part of said ducts connecting said compressor, condenser and evaporating coil in circuit, a starting device for the engine and a normally closed starter control switch responsive to engine speed for opening when the engine is running, a thermostat responsive to high temperature in the space being conditioned, circuit means energized in response to operation of said thermostat for actuating said control valve means and for energizing said cooling fluid pump and said fan, and means in fluid communication with the refrigerant ducts and being responsive to the pressures therein and connected to said circuit means for procuring operation of said engine starting device when the engine is at a standstill with the starter control switch closed, and for procuring continued running of the engine during continuance of said thermostat in responded condition, said starter control switch being connected to said starting device and being effective to procure disconnection of the starting device when the engine has attained a predetermined running speed.

2. In a plant for air conditioning a space and comprising an internal combustion engine, a refrigerating system including a refrigerant compressor for circulating a refrigerant medium in a refrigeration cycle including the compressor, a condenser, an evaporator in said space, and an expansion valve for delivering expanding refrigerant into said evaporator, the combination therewith of a first switch responsive to the refrigerant pressure for closing when the compressor return side pressure rises above a predetermined value and to open when the compressor return side pressure has been reduced by compressor action below a predetermined value; a centrifugal switch responsive to engine speed for closing when the engine is at a standstill and to open when the engine is operating at above stalling speed, an engine starter motor, and means controlled by said first switch and said centrifugal switch for procuring energization of said starter motor and starting of the engine when the first switch is closed and to terminate such starter energization when the engine is operating; ignition means for the engine connected for energization through said first switch whereby the engine ignition is terminated upon opening of the first switch; and a clutch means for connecting the engine and the compressor and responsive to engine speed for effecting the said connection while the engine is operating at not less than a predetermined minimum speed, and effective to assure disconnection of the compressor from the engine so long as the engine is at a standstill.

3. In an air conditioning plant as in claim 2, the combination therewith of a thermostatic switch means responsive to the temperature in the space being conditioned, and circuit means controlled by the thermostat switch means for preventing the starting of the engine when the thermostat switch means indicates the absence of cooling demand.

4. In an air conditioning plant as in claim 2, the combination therewith of a valve for preventing access of refrigerant to the evaporating coil, a thermostat switch means responsive to the temperature of the space being conditioned, and circuit means controlled by the thermostat switch means for procuring opening of said preventing valve upon cooling demand in the space and closing of said preventing valve in the absence of such cooling demand.

5. In a plant for air conditioning a space and comprising an internal combustion engine, a refrigerating system including a refrigerant compressor driven by said engine for circulating a refrigerant medium in a refrigeration cycle including the compressor, a condenser, an expansion valve, and an evaporator, the combination therewith of an air conduit around said cooling coil with an opening therefrom into the space being conditioned, said condenser having pipes one within the other with the space between the pipes forming a part of the refrigerant cycle duct system, means including a pump and electrically controlled driving means therefor for supplying a cooling fluid into the inner pipe, a thermostatic switch responsive to the temperature in the space being conditioned, a solenoid valve responsive to operation of said thermostatic switch for controlling refrigerant flow to said cooling coil, a starter for said engine, means responsive to the pressure of refrigerant gas during return from the cooling coil to the compressor and including an electrical starting switch, a centrifically controlled switch responsive to the engine speed for being closed while the engine is at a standstill and at low speed, said starting switch and centrifugal switch being connected in series and effective for energization of the said starter, and means controlled by said thermostatic switch for controlling the energization of said starter and for stopping said engine.

References Cited in the file of this patent

UNITED STATES PATENTS

| | | | |
|---|---|---|---|
| 1,943,969 | Hulse | Jan. 16, | 1934 |
| 2,094,221 | Shaller | Sept. 28, | 1937 |
| 2,130,606 | Wanamaker | Sept. 20, | 1938 |
| 2,145,380 | Weiland | Jan. 31, | 1939 |
| 2,173,961 | Craft | Sept. 26, | 1939 |
| 2,180,760 | Mayo | Nov. 21, | 1939 |
| 2,181,354 | Winters | Nov. 28, | 1939 |
| 2,257,975 | Miller et al. | Oct. 7, | 1941 |
| 2,290,426 | Haines | July 21, | 1942 |
| 2,318,893 | Smith | May 11, | 1943 |
| 2,319,310 | Euwer | May 18, | 1943 |
| 2,341,781 | Hornaday | Feb. 15, | 1944 |
| 2,344,864 | Griswold | Mar. 21, | 1944 |
| 2,362,084 | Miller | Nov. 7, | 1944 |
| 2,479,170 | Kuempel | Aug. 16, | 1949 |
| 2,495,350 | Smith | Jan. 24, | 1950 |
| 2,527,790 | Borgerd | Oct. 31, | 1950 |
| 2,546,785 | Rose | Mar. 27, | 1951 |
| 2,600,316 | Moore | June 10, | 1952 |
| 2,636,356 | Ryan | Apr. 28, | 1953 |
| 2,749,048 | Edge | June 5, | 1956 |
| 2,749,049 | Smith | June 5, | 1956 |
| 2,781,642 | Jacobs | Feb. 19, | 1957 |
| 2,787,129 | Evans | Apr. 2, | 1957 |